(12) United States Patent
Shin et al.

(10) Patent No.: US 7,394,772 B2
(45) Date of Patent: Jul. 1, 2008

(54) METHOD OF ROUTING POINT-TO-MULTIPOINT TRAFFIC ON AN MPLS NETWORK

(75) Inventors: Yong Sik Shin, Seoul (KR); Si Hoon Ryu, Sungnam-si (KR); Dong Hahk Lee, Sungnam-si (KR); Jong Tae Ihm, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 1021 days.

(21) Appl. No.: 10/305,392

(22) Filed: Nov. 27, 2002

(65) Prior Publication Data

US 2003/0099235 A1 May 29, 2003

(30) Foreign Application Priority Data

Nov. 27, 2001 (KR) .................... 10-2001-0074381

(51) Int. Cl.
*H04L 12/28* (2006.01)
(52) U.S. Cl. ...................... 370/254; 370/390
(58) Field of Classification Search .............. 370/238, 370/254–256, 338, 351, 389–392, 401
See application file for complete search history.

(56) References Cited

U.S. PATENT DOCUMENTS

| | | | | |
|---|---|---|---|---|
| 4,740,954 A | * | 4/1988 | Cotton et al. ............... | 370/408 |
| 5,490,143 A | * | 2/1996 | Hara et al. .................. | 370/447 |
| 6,034,961 A | * | 3/2000 | Masuo et al. ............... | 370/219 |
| 6,148,000 A | * | 11/2000 | Feldman et al. ............. | 370/397 |
| 6,336,129 B1 | * | 1/2002 | Ise et al. ..................... | 709/201 |
| 6,374,303 B1 | * | 4/2002 | Armitage et al. ........... | 709/242 |
| 6,529,958 B1 | * | 3/2003 | Oba et al. ................... | 709/237 |
| 6,563,793 B1 | * | 5/2003 | Golden et al. ............... | 370/236 |
| 6,631,128 B1 | * | 10/2003 | Lemieux ..................... | 370/351 |
| 6,778,531 B1 | * | 8/2004 | Kodialam et al. ........... | 370/390 |
| 6,862,288 B2 | * | 3/2005 | Sharma et al. .............. | 370/403 |
| 6,879,594 B1 | * | 4/2005 | Lee et al. .................... | 370/408 |
| 6,901,048 B1 | * | 5/2005 | Wang et al. ................. | 370/228 |
| 6,904,018 B2 | * | 6/2005 | Lee et al. .................... | 370/238 |
| 6,947,434 B2 | * | 9/2005 | Hundscheidt et al. ....... | 370/401 |
| 6,985,960 B2 | * | 1/2006 | Takashima et al. .......... | 709/238 |
| 2002/0054405 A1 | * | 5/2002 | Guo et al. ................... | 359/118 |
| 2003/0037276 A1 | * | 2/2003 | Mo et al. ...................... | 714/4 |

\* cited by examiner

*Primary Examiner*—Wing Chan
*Assistant Examiner*—Hong Sol Cho
(74) *Attorney, Agent, or Firm*—Lowe Hauptman Ham & Berner LLP

(57) ABSTRACT

A point-to-multipoint traffic routing method that routes a multicast traffic through a determined tree on an MPLS network. A node on an MPLS network conducting a point-to-multipoint traffic routing method receives a message with an object including topology information on a determined tree, determines whether itself is a copy node or not based on the topology information, and copies, if determined to be a copy node, the received message to transmit to at least two nodes specified as next by the topology information. The present routing method ensures smooth operations of a copy and a merge node as well as an overall network.

18 Claims, 3 Drawing Sheets

| Length(Type) | | Class-Num | C-Type |
|---|---|---|---|
| Setup Priority | Hold Priority | Tree ID | C-Type |
| Required Reservation Bandwidth | | | RSV Style |
| On TreeNode IDs | | | |

| Length(Type) | Class-Num | C-Type |
|---|---|---|
| Tree ID | Reserved Bandwidth | |
| To BranchNode IDs | | |
| Others | | |

# METHOD OF ROUTING POINT-TO-MULTIPOINT TRAFFIC ON AN MPLS NETWORK

BACKGROUND OF THE INVENTION

1. Field of the Invention

The present invention relates to an MPLS (Multi-Protocol Label Switching)-based multicast routing protocol, more particularly, to a point-to-multipoint traffic routing method that routes a multicast traffic through a determined tree on an MPLS network.

2. Description of the Related Art

An MPLS ensures quality of service (QoS) for a traffic transported through an IP (Internet Protocol) network and efficient use of network resources. Therefore, it is spotlighted in traffic engineering field.

The MPLS traffic engineering determines an LSP (Label Switched Path) in various ways to appropriately accept a variety of QoS demands for users' IP packets. The LSP is a point-to-point (PTP) path connecting from an ingress to an egress edge router.

By the way, due to rapid growth of an IP base network, various multimedia services such as VoIP, VOD, AOD, on-line movie, and video conference are being demanded. Many of those multi-media services require a point-to-multipoint (PTM) tree. If a PTM multimedia service is provided through PTP LSPs, use efficiency of network resources becomes worse and/or management of QoS becomes not easy. This is because multicast traffic is routed through a unicast way.

In the Internet proposal room of the IETF committee, many ways to distribute MPLS label are being listed up. Those many ways use PIM-SM or PIM-DM which is conventional multicast IP protocol. Besides the proposed many ways, MPLS multicasting way is being standardized in the IETF.

However, since tree determining methods of existing multicast protocols proposed until now are all receiver-based, it is not easy to reflect intentions of a service provider or users appropriately. As a result, network resources can not be used efficiently, which results in deterioration of service quality.

To resolve such problems, new traffic path determining methods, which determine traffic paths at an originating node on an MPLS network, have been proposed by this applicant. They have been filed at Korean Intellectual Property Office in Patent Application No. 2001-65798, No. 2001-65799, and No. 2001-65800, respectively on Oct. 24, 2001 altogether.

SUMMARY OF THE INVENTION

It is an object of the present invention to provide a method of routing forward and backward traffic on a multicast traffic tree determined for a PTM traffic at an originating node of an MPLS network.

A node conducting a method of routing a point-to-multipoint traffic on an MPLS network in accordance with the present invention receives a message with an object including topology information on a determined tree, determines whether itself is a copy node or not based on the topology information, and copies, if determined to be a copy node, the received message to transmit to at least two nodes specified as next by the topology information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIGS. 3 and 4 illustrate an MPLS network which an MMRP (MPLS-based Multicast Routing Protocol) of the present invention is applied to;

DETAILED DESCRIPTION OF THE PREFERRED EMBODIMENTS

In order that the invention may be fully understood, a preferred embodiment thereof will now be described with reference to the accompanying drawings.

In this specification, a tree means a collection of paths from an originating point, namely, an ingress to several destination points, namely, egresses. A term of 'tree' is also called 'LST' (Label Switched Tree) afterward.

Figure 1:
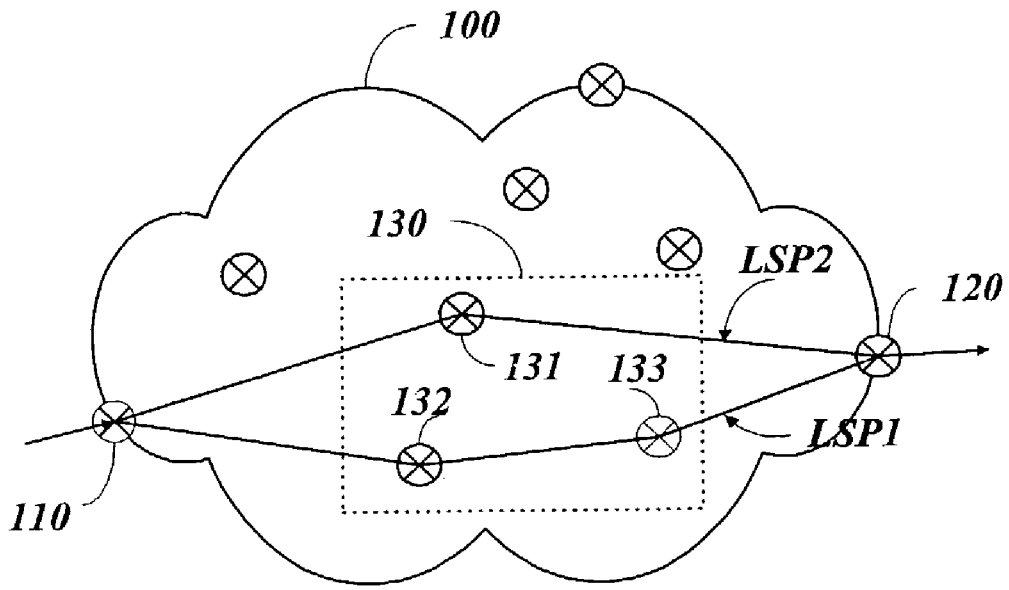
FIG. 1 is an illustrative MPLS network composed of several routers.

FIG. 1 is an illustrative MPLS network 100 composed of several routers. Among those routers, a router functioning an entrance of the network 100 for an arbitrary data traffic is called ingress LER (Label Edge Router) while a router functioning as an exit of the network 100 is called egress LER. And, a router, located on a path from an ingress to an egress LER, functioning as a relay node is called LSR (Label Switching Router). In FIG. 1, The numeral 110, 120, and 130 represent ingress LER, egress LER, and LSRs, respectively. A path connected from the ingress 110 to egress LER 120 through no or at least one LSR 130 is called 'LSP'. In FIG. 1, two LSPs 'LSP1' and 'LSP2' are marked. The LSP 'LSP1' is a path of 110→132→133→120 and the LSP 'LSP2' a path of 110→131→120. Such LSPs are determined for an input traffic at the ingress LER 110.

Figure 2:
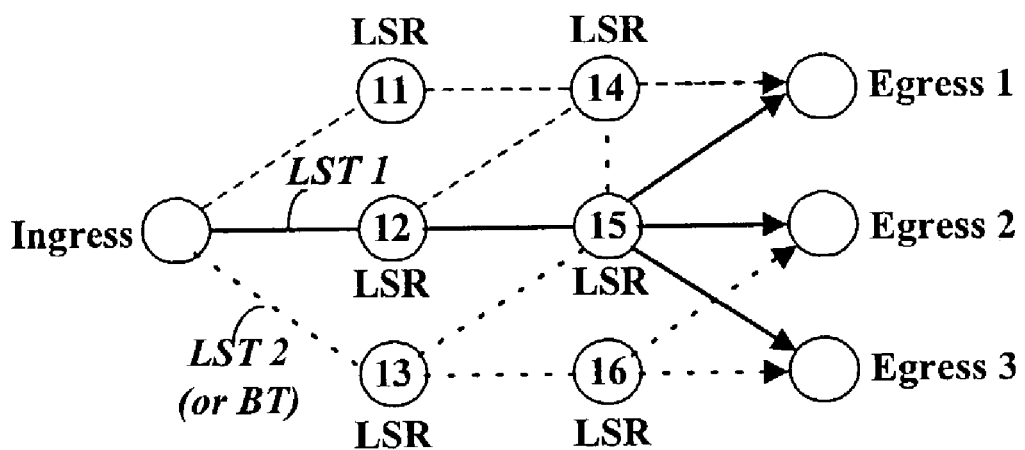
FIG. 2 is another illustrative MPLS network in which LSTs (Label Switched Trees) are established for a multicast traffic.

FIG. 2 is another illustrative MPLS network in which LSTs (Label Switched Trees) are established for a multicast traffic. FIG. 2 illustrates that an ingress LER has determined two LSTs 'LST1' and 'LST2', equivalent to multiple LSPs, or one LST 'LST1' and a backup tree 'BT' for an input multicast traffic destined for three egress LERs 'Egress1', 'Egress2', and 'Egress3'.

The first LST 'LST1', drawn as thick sold line, is a tree of Ingress→LSR2→LSR5→Egress1,2,3 and the second LST 'LST2' or the backup tree 'BT', drawn as thick dotted line, is a tree of Ingress→via LSRs→Egress1,2,3. Every LST is determined by the ingress LER as aforementioned when routing of a multicast traffic is demanded.

As shown in FIG. 2, the trees 'LST1' and 'LST2' (or a backup tree 'BT') are path collections from the ingress to three egresses 1,2,3.

The present invention defines an MMRP (MPLS-based Multicast Routing Protocol) for routing a multicast traffic through trees determined as illustrated.

Namely, the present invention relates to a protocol for the tree 'LST1' if a single tree is set-up for multicasting, for the trees 'LST1' and 'LST2' if two trees are used, and for a single tree 'LST1' and a single backup tree 'BT' if a tree and a backup tree are set-up, respectively.

Figure 3:
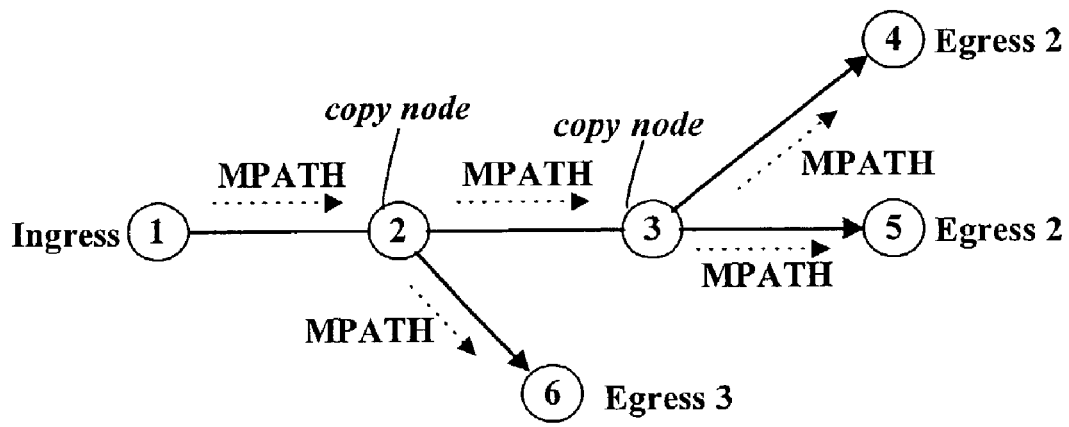
Figure 4:
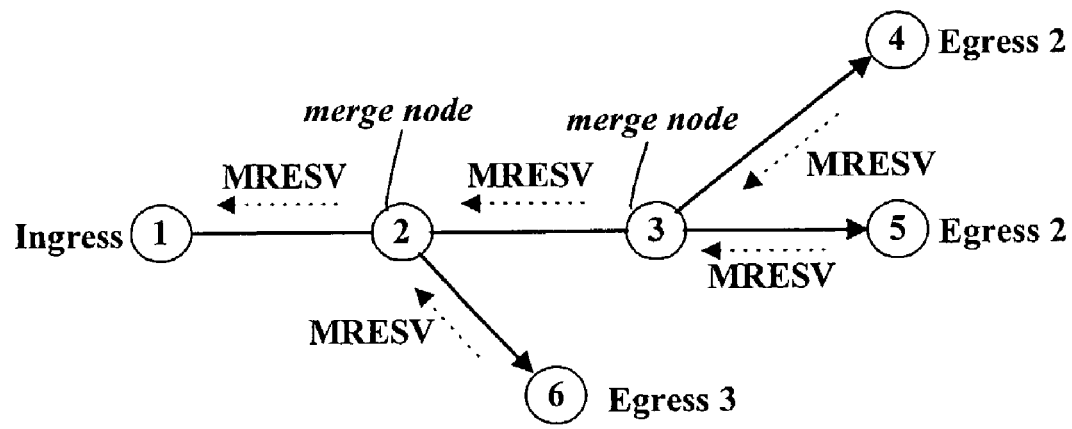

FIGS. 3 and 4 illustrate an MPLS network which an MMRP of the present invention is applied to. FIGS. 3 and 4 show an MPATH and an MRESV message that are routed forward and backward, respectively between an ingress 1 and egresses 4, 5 and 6.

Figures 5, 6, 7:
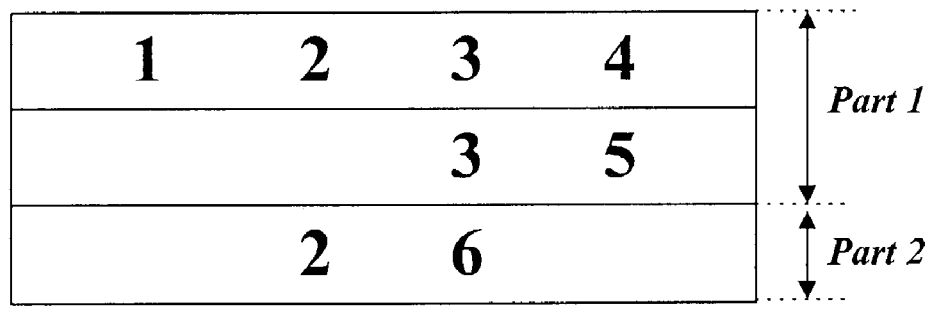
FIG. 5 shows a format of an MRO (Multicast Route Object) defined newly according to the present invention.
FIG. 6 illustrates topology information in case that a tree is determined as shown in FIGS. 3 and 4.
FIG. 7 shows a format of an MRRO (Multicast Reverse Route Object) defined newly according to the present invention.

The MPATH message further includes an MRO (Multicast Route Object) defined as FIG. 5 besides objects of an existing PATH message defined by RSVP-TE (Resource ReServation Protocol Traffic Engineering) while the MRESV message further includes an MRRO (Multicast Reverse Route Object) defined as in FIG. 7 besides an existing RESV message specified by RSVP-TE. These newly-defined messages are denoted by 'MPATH' and 'MRESV' to distinguish from 'PATH' and 'RESV' message, respectively in below explanation.

When the MPATH message is transmitted along a setup tree in downstream direction, namely in forward direction, junction nodes (called 'copy node' or 'branch node') 2 and 3 copy a received message individually. The junction nodes (called 'merge node') 2 and 3 merge the MRESV message transmitted in upstream direction, namely in backward direction. Comparing FIGS. 3 and 4 each other, the copy nodes and the merge nodes are same, respectively.

As aforementioned, the MPATH message includes objects of a PATH message defined by RSVP-TE as well as a new object 'MRO' defined as in FIG. 5 according to MMRP of the present invention.

The MRO of FIG. 5 includes the following fields: 'Length/Type' indicative of length and type of information; 'Setup Priority'; 'Hold Priority'; 'Tree ID' to identify a setup tree, e.g., to identify a concerned tree among a plurality of trees and/or backup trees; 'Required Reservation Bandwidth' indicative of bandwidth, allocated for a concerned tree, that has been set by a tree-determining algorithm; 'RSV Style' to indicate how to reserve bandwidth of a path on a concerned tree; and 'On TreeNode Ids' containing topology information about a concerned tree that has been determined through a tree-determining algorithm. Supposing that a tree is determined as shown in FIG. 3 (FIG. 4), the field 'On TreeNode Ids' contains matrix information of FIG. 6 on the tree topology.

When a message containing topology information like FIG. 6 arrives at the node 2 of FIG. 3, the node 2 regards itself as a copy node after analyzing the matrix structure in which its identifying number is written at two rows, and it copies the received message to transmit to next two nodes 3 and 6. At this time, the copy node 2 may transmit all information of the field 'On TreeNode Ids'. Instead, it sends only part 1 of the topology information of FIG. 6 to the node 3 and only part 2 to the node 6.

In the same manner, the node 3 copies the received MPATH message to the next nodes 4 and 5.

When copying the received message, the node 2 or 3 may delete partial information related with previous nodes from topology information written in MRO. This operation is an additional burden on a node, however, the size of message to be transmitted becomes smaller.

After the node 2 or 3 copies and transmits the MPATH message, it measures an elapsing time until the MRESV with an MRRO of FIG. 7 is received. This is to notify an originating node, namely, the ingress 1 of transmission error if the sent message is not acknowledged from the next node before a preset time expires.

The merge node 2 or 3 of FIG. 4 receives a message containing the MRRO defined newly as in FIG. 7 from at least one next node (nodes 3 and 6 for node 2, nodes 4 and 5 for node 3), and then determines allowable bandwidth after analyzing the MRRO. However, the bandwidth resource would be reserved as demanded by the MRO of FIG. 5 in general because a tree has been determined in consideration of allowable bandwidth.

The MRRO of FIG. 7 includes the following fields: 'Length/Type' indicative of length and type of information; 'Class-Num' for information classifying number; 'Tree ID' to identify a setup tree, e.g., to identify a concerned tree among a plurality of trees and/or backup trees; 'Reserved Bandwidth' indicative of a reserved bandwidth by next nodes (a merge node may determine to reserve bandwidth based on this field); 'To BranchNode Ids', corresponding to topology information of the MRO of FIG. 5, to indicate a path to a branch node; and 'others' reserved for other special subjects. The field 'To BranchNode Ids' may include same topology information contained in the MRO of FIG. 5.

The above-explained PTM traffic routing method on an MPLS network has extended an RSVP-TE protocol, which is under standardization by IETF, to route forward and backward multicast traffic via a traffic tree determined for multicasting, whereby, operations of a copy and a merge node as well as an overall routing process can be smoothly conducted.

The detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of routing a point-to-multipoint traffic at a node on an MPLS (Multi-Protocol Label Switched) network, said method comprising the steps of:
   (a) receiving a message with an object including topology information on a determined tree;
   (b) determining whether said node is a copy node or not based on the topology information; and
   (c) copying, if determined to be a copy node, the received message to transmit to at least two nodes specified as next by the topology information;
   wherein said topology information included in the object sent with the message includes identities of at least nodes downstream from said node on said tree; and
   wherein said step (b) determines that said node is a copy node if the topology information included in the object sent with the message includes multiple entries of the identity of said node.

2. The method of claim 1, wherein said object being sent with the message includes, besides the topology information, information to identify the determined tree, information to specify bandwidth of the determined tree, and information to indicate how to reserve bandwidth of a path on the determined tree.

3. The method of claim 2, wherein said tree identifying information is to identify the determined tree among a plurality of trees and/or backup trees or globally on the MPLS network.

4. The method of claim 1, wherein said node determined to be a copy node in said step (b) acts as a merge node for backward traffic.

5. The method of claim 1, further comprising the step of merging backward messages with a reverse object including first information indicative of a bandwidth reserved by nodes next to said node, and second information, corresponding to said topology information, to indicate a path to a branch node, the backward messages being received from at least two next nodes.

6. The method of claim 5, wherein said merging step further determines an allowable bandwidth after analyzing the received reverse object.

7. The method of claim 6, wherein the allowable bandwidth is determined based on the first information.

8. The method of claim 5, wherein said backward message includes, besides said reverse object, same information that a RESV message specified by RSVP-TE (Resource ReServation Protocol Traffic Engineering) has.

9. The method of claim 1, further comprising the step of measuring an elapsing time until a backward message to acknowledge said transmitted message is received.

10. The method of claim 9, wherein said measuring step notifies a preceding node of a transmission error if said transmitted message is not acknowledged from a next node before a preset time expires.

11. The method of claim 1, wherein said step (c) provides each next node with not entire but partial topology information that said each next node is included in.

12. The method of claim 1, wherein said step (c) provides each next node with not entire but partial topology information that previous nodes are removed from.

13. A method of routing a point-to-multipoint traffic at a node on an MPLS (Multi-Protocol Label Switched) network, said method comprising the steps of:
 (a) receiving a message with an object including topology information on a determined tree;
 (b) determining whether said node is a copy node or not based on the topology information; and
 (c) copying, if determined to be a copy node, the received message to transmit to at least two nodes specified as next by the topology information;
 wherein said topology information included in the object sent with the message includes identities of at least nodes downstream from said node on said tree; and
 wherein said message includes, besides said object, same information that a PATH message specified by RSVP-TE (Resource ReServation Protocol Traffic Engineering) has.

14. A method of routing a point-to-multipoint traffic at a node on an MPLS (Multi-Protocol Label Switched) network, said method comprising the steps of:
 receiving a message with an object including topology information on a determined tree;
 determining whether said node is a copy node or not based on the topology information;
 copying, if determined to be a copy node, the received message to transmit to at least two nodes specified as next by the topology information; and
 merging backward messages with a reverse object including first information indicative of a bandwidth reserved by nodes next to said node, and second information, corresponding to said topology information, to indicate a path to a branch node, the backward messages being received from said at least two next nodes.

15. The method of claim 14, wherein said merging step further determines an allowable bandwidth after analyzing the received reverse object.

16. The method of claim 15, wherein the allowable bandwidth is determined based on the first information.

17. The method of claim 14, wherein each said backward message includes, besides said reverse object, same information that a RESV message specified by RSVP-TE (Resource ReServation Protocol Traffic Engineering) has.

18. A method of routing a point-to-multipoint traffic at a node on an MPLS (Multi-Protocol Label Switched) network, said method comprising the steps of:
 receiving a message with an object including topology information on a determined tree;
 determining whether said node is a copy node or not based on the topology information; and
 copying, if determined to be a copy node, the received message to transmit to at least two nodes specified as next by the topology information;
 wherein said copying step provides each said next node with not entire but partial topology information that previous nodes are removed from.

* * * * *